(12) United States Patent
Wakayama

(10) Patent No.: US 8,348,115 B2
(45) Date of Patent: Jan. 8, 2013

(54) SCRIBE LINE FORMING DEVICE AND SCRIBE LINE FORMING METHOD

(75) Inventor: Haruo Wakayama, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 2029 days.

(21) Appl. No.: 10/533,650

(22) PCT Filed: Nov. 4, 2003

(86) PCT No.: PCT/JP03/14080
§ 371 (c)(1),
(2), (4) Date: Nov. 25, 2005

(87) PCT Pub. No.: WO2004/041493
PCT Pub. Date: May 21, 2004

(65) Prior Publication Data
US 2006/0137505 A1    Jun. 29, 2006

(30) Foreign Application Priority Data
Nov. 6, 2002  (JP) .................................. 2002-323112

(51) Int. Cl.
*B26F 3/00*    (2006.01)

(52) U.S. Cl. .............................................. 225/2; 225/96

(58) Field of Classification Search .................. 225/2, 96
See application file for complete search history.

(56) References Cited

U.S. PATENT DOCUMENTS

| | | | |
|---|---|---|---|
| 3,276,302 A * | 10/1966 | Insolio | ............................. 83/881 |
| 6,252,197 B1 | 6/2001 | Hoekstra et al. | |
| 6,489,588 B1 * | 12/2002 | Hoekstra et al. | ......... 219/121.67 |
| 6,536,121 B1 * | 3/2003 | Ishikawa et al. | ............... 33/18.1 |
| 6,800,831 B1 | 10/2004 | Hoetzel | |
| 2002/0125232 A1 | 9/2002 | Choo et al. | |

FOREIGN PATENT DOCUMENTS

| | | |
|---|---|---|
| EP | 1 036 773 | 9/2000 |
| JP | 57-107052 | 7/1982 |

(Continued)

OTHER PUBLICATIONS

International Search Report for corresponding Application No. PCT/JP2003/014080, mailed Feb. 17, 2004.

(Continued)

*Primary Examiner* — Sean Michalski
(74) *Attorney, Agent, or Firm* — Renner, Otto, Boisselle & Sklar, LLP

(57) ABSTRACT

A vertical crack is generated at a desired position on a brittle material substrate S by making a wheel tip 5a of a glass cutter 5 move while being in contact with the substrate surface by a load which does not allow the wheel tip 5a to damage the surface, using an armature 6 applying an abrupt impact force for generating the vertical crack having a predetermined depth, to the glass cutter 5 moving on the substrate. A scribe line is formed as the vertical crack is urged to extend along a planned scribe line, due to a stress gradient exerted onto the vertical crack and occurring between a compressive stress in an irradiation area on the substrate at which a laser beam is irradiated from a laser beam oscillator 8 and a tensile stress in a cooling area made by a cooling medium released from a cooling nozzle 7.

18 Claims, 5 Drawing Sheets

FOREIGN PATENT DOCUMENTS

| | | |
|---|---|---|
| JP | 10-189496 | 7/1998 |
| JP | 2000-61676 A | 2/2000 |
| JP | 2000-63137 A | 2/2000 |
| JP | 2001-151525 A | 5/2001 |
| JP | 2001-58317 A | 6/2001 |
| JP | 2001-176820 | 6/2001 |
| JP | 2002-121039 | 4/2002 |
| JP | 2002-308637 A | 10/2002 |
| WO | 01/32349 A1 | 5/2001 |

OTHER PUBLICATIONS

Supplementary European Search Report for corresponding Application No. EP 03 77 0142, dated Aug. 18, 2006.

Chinese Office Action dated Apr. 27, 2011 for corresponding Chinese Application No. 200910139536.0.

* cited by examiner

SCRIBE LINE FORMING DEVICE AND SCRIBE LINE FORMING METHOD

TECHNICAL FIELD

The present invention is related to scribe line forming apparatuses and scribe line forming methods for forming linear scribe lines used for dividing a brittle substrate such as a glass substrate included in a liquid crystal display device or the lake.

BACKGROUND ART

Liquid crystal displays are applicable to small-sized information terminal devices and projection devices and are in demand in a wide range of fields as the personal computer market expands along with the rapid progress of information processing technology. The future development of liquid crystal displays has been drawing much attention.

Particularly, for liquid crystal displays for personal computers and televisions, the demand for making the display screens larger, with higher definition, as well as lighter, is increasing. Development has also been made to have larger and thinner glass substrates in order to meet such increasing demand. As glass substrates get larger in size and thinner, a high-level substrate dividing technique is in demand for dividing glass substrates into desired sizes with high accuracy.

Brittle substrates such as glass substrates may be divided into sections by performing a scribe step of forming a linear scribe line extending in a desired dividing direction on the surface of a glass substrate and a break step of dividing the glass substrate along the scribe lines by applying a bending moment along the scribe line formed on the surface of the glass substrate.

In the scribe step of forming the scribe line on the glass substrate, if the scribe line which is a line with a vertical crack can be formed deep into the glass substrate and vertical to the surface of the glass substrate, it is possible to improve the accuracy level when the substrate is divided into sections along the scribe line in the break step to be performed later; therefore, it is important to make the vertical crack deep.

For example, using a manually-operated cutter as disclosed in the Japanese Unexamined Utility Model Application Publication No. 59-88429, a scribe line may be formed on the surface of a brittle material substrate by rolling a wheel tip attached at the tip of a cutter over the surface of the glass substrate with pressure. Further, it is also possible to use an apparatus disclosed in the Japanese Unexamined Patent Application Publication No. 55-116635 for forming a number of scribe lines on the surfaces of a plurality of brittle material substrates continuously and automatically.

A method of forming a scribe line by cutting the surface of a glass substrate with a point diamond is not suitable for forming a scribe line on a glass substrate used in a liquid crystal display device because cullet (glass shavings) is generated without exception in the process of cutting the glass substrate with the point diamond.

Further, according to the method wherein a wheel tip being rotatable held is rolled over the surface of a glass substrate with pressure, a vertical crack is generated by pressing the wheel tip against the surface of the substrate using a lifting and lowering mechanism such as an air cylinder.

With such a pressing method using a lifting and lowering mechanism, however, it is not possible to easily form a vertical crack that has a sufficient depth in the surface of the glass substrate unless the pressure applied by the lifting and lowering mechanism is large. On the other hand, in case the pressure being applied is large, when the wheel tip is made to proceed up onto an edge of a glass substrate, there is a possibility that the edge of the glass substrate may be damaged, for example, it may be chipped off. Besides, in case the pressure being applied is large, there are possibilities of other problems; for example, a crack (a horizontal crack) may be generated in an unwanted direction in the plane portion of a glass substrate, and such a crack may cause chipping in a division plans or in an edge portion of the glass substrate including a division plane, when the glass substrate is divided into sections. In addition, also with this method, glass cullet is generated in the scribing process.

Further, in the case where a glass substrate has a "warp", another problem Is that the wheel tip is not able to follow unevenness resulting from the "warp" at the surface of the substrate, and therefore it is impossible to obtain an appropriate vertical crack in the surface of the glass substrate.

In order to solve the aforementioned problems, the present invention aims to provide a scribe line forming apparatus and a scribe line forming method by which it is possible to generate a vertical crack having a sufficient depth in a glass substrate, without causing a problem such as an edge of the glass substrate being chipped off.

DISCLOSURE OF THE INVENTION

In order to solve the problems described above, the present invention provides a scribe line forming apparatus comprising: a vertical crack forming member that has a blade at a tip thereof and is used for forming a vertical crack to be an origination point of a scribe line by pressing the blade against a surface of a brittle substrate with pressure; an impact force applying means for applying an abrupt impact force to the vertical crack forming member in order to generate the vertical crack having a predetermined depth at a desired position in the brittle substrate; a heating means for forming an area having a temperature lower than a softening point of the brittle substrate; a cooling means for cooling the brittle substrate; an arrangement movement means for arranging the heating means, the vertical crack forming member, the impact force applying means, and the cooling means to be positioned so as to move relative to the brittle substrate at predetermined intervals along a planned scribe line that is prearranged on the surface of the brittle substrate; and control unit that controls driving of the impact force applying means.

It is preferable to have an arrangement wherein the control unit controls driving of the vertical crack forming member and the arrangement movement means so that the blade moves while being kept in contact with the surface of the brittle substrate by a load which does not allow the blade to damage the surface of the brittle substrate, and when the blade is positioned in the vicinity of an edge of the brittle substrate and in the vicinity of a passing point at which the blade passes a previously-formed scribe line, the control unit controls the driving of the impact force applying means so as to generate the vertical crack having the predetermined depth in the brittle substrate.

It is also preferable to have an arrangement wherein the heating means includes a servo mechanism that detects a change in a height of the surface of the brittle substrate from up-and-down movements of the vertical crack forming member moving on the brittle substrate and adjusts a focal point of a laser beam irradiated from a laser beam oscillator according to a result of the detection.

It is preferable to have an arrangement wherein the cooling means is arranged by the arrangement movement means so as to move up and down in conjunction with up-and-down movements of the vertical crack forming member that moves on the brittle substrate.

It is preferable to have an arrangement wherein the arrangement movement means either arranges the vertical crack forming member, and the heating means, and the cooling means to be positioned in the stated order from a fore side of the planned scribe line, or arrange the heating means, the vertical crack forming member, and the cooling member to be positioned in the stated order from the fore side of the planned scribe line.

It is preferable to have an arrangement wherein the arrangement movement means arranges the vertical crack forming member, the heating means, and the cooling means so as to be able to change positions relative to one another.

The cooling means may be a cooling nozzle from which a cooling medium is released.

The cooling means may include a servo mechanism that adjusts a height at which the cooling means is positioned.

The vertical crack forming member may be a glass cutter that includes a wheel tip serving as the blade and rollably supports the wheel tip.

The heating means may be a laser beam oscillator that irradiates a predetermined laser beam.

The impact force applying means may be an armature that generates movement inertia for pressing the blade against the surface of the brittle substrate by turning on or off electricity supplied to a solenoid coil.

The scribe line forming apparatus may further comprise one of a laser displacement gauge and a contact displacement gauge for detecting a change in a height of the surface of the brittle substrate.

The brittle substrate may be one of a glass substrate for a liquid crystal display device, a glass substrate for a plasma display panel, and a glass substrate for an organic EL display panel.

Another aspect of the present invention provides a scribe line forming method comprising the steps of while making a vertical crack forming member having a blade at a tip thereof move on a brittle substrate, generating a vertical crack having a predetermined depth at a desired position on a brittle substrate with an impact force applying means that applies an abrupt impact force to the blade; forming a scribe line by forming, with the vertical crack, an irradiation area that has a temperature lower than a softening point of the brittle substrate along a planned scribe line arranged on the brittle substrate, and forming a cooling area in rear of the irradiation area.

It is preferable to have an arrangement wherein the generating step of generating the vertical crack having the predetermined depth at the desired position on the brittle substrate by the impact force applying means performed when the blade is positioned in the vicinity of an edge of the brittle substrate and in the vicinity of an intersection position at which the blade intersects a previously-formed scribe line.

BEST MODE FOR CARRYING OUT THE INVENTION

The following describes in detail a scribe line forming apparatus and a scribe line forming method according to the present invention, with reference to the drawings.

The First Embodiment

Figure 1:
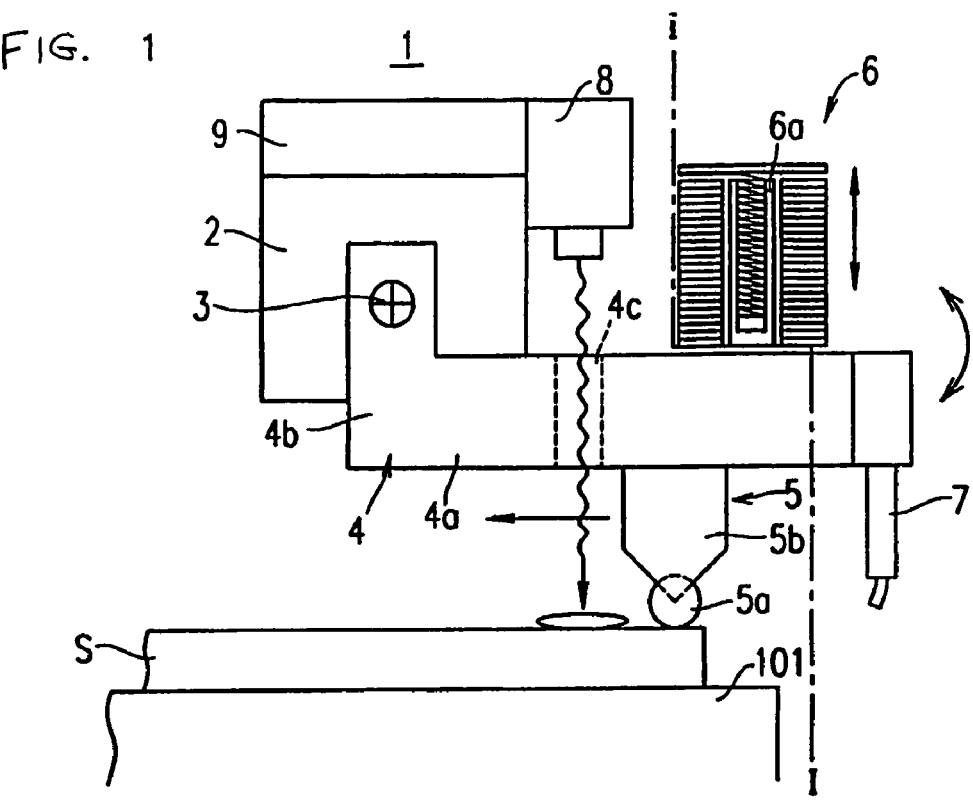
FIG. 1 is a side view that schematically shows a scribe line forming apparatus according to the first embodiment.
Figure 2:
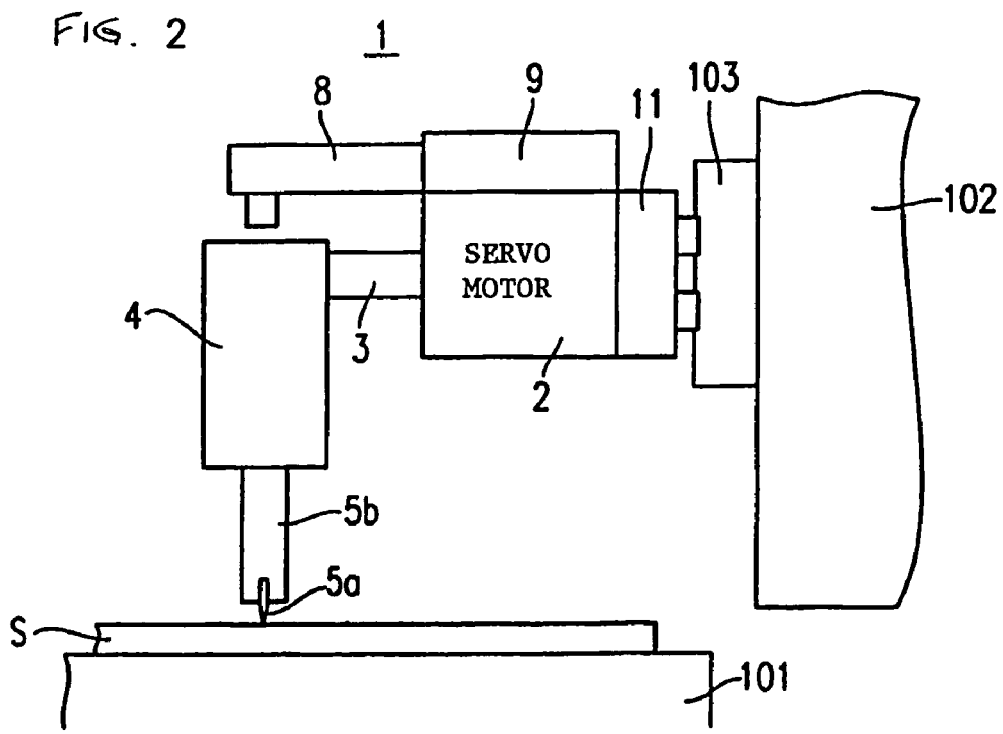
FIG. 2 is a front view that schematically shows the scribe line forming apparatus according to the first embodiment.

FIG. 1 is a side view that schematically shows a scribe line forming apparatus 1 according to a first embodiment. FIG. 2 is a front view of the scribe line forming apparatus 1 viewed from the I-I cross-sectional line in FIG. 1.

The scribe line forming apparatus 1 includes, as shown in FIGS. 1 and 2, a table 101 used for horizontally fixing a brittle material substrate S on which scribe lines are to be formed. Here, the brittle material substrate S described in the present description is, more specifically, a substrate having a large size called a mother substrate. Substrates that may be made of glass, ceramic, semiconductor wafers or the like are sequentially divided into sections of predetermined smaller sizes for a variety of uses. On a side wall 102 on the side of the table 101 used for fixing the brittle material substrate S, a guide rail 103 extending horizontally (i.e. extending in a direction vertical to the plane of the drawing page) is provided. One end of a driving apparatus 11 having a driving motor inside is connected to the guide rail 103. Being driven by the driving motor, the driving apparatus 11 is operable to slide in predetermined directions in accordance with the direction in which the guide rail 103 extends.

A servo motor 2 is provided at the other end of the driving apparatus 11. The servo motor 2 has, on the side opposite to the driving apparatus 11 side, a rotation shaft 3 that projects horizontally for a predetermined distance. The rotation shaft 3 is rotated and driven by the servo motor 2. A supporting frame 4 that rotates integrally with the rotation shaft 3 is provided at the tip of the rotation shaft 3.

The supporting frame 4 attached to the rotation shaft 3 of the servo motor 2 has, as shown In FIG. 1, a frame body 4a being a flat plate and a projection part 4b projecting upward to a predetermined height from one end of the frame body 4a, so that the supporting frame 4 is substantially L-shaped in a side view. The supporting frame 4 is disposed in such a manner that the end having the projection part 4b is positioned to the fore in terms of the direction of the movement along the guide rail 103 (i.e. the left side of the drawing) and that the upper end of the projection part 4b is attached to the rotation shaft 3 of the servo motor 2.

A glass cutter 5 is attached to the lower surface, near the rear end, of the frame body 4a of the supporting frame 4. The glass cutter 5 includes a wheel tip 5a made of a material having super hardness such as super-hard metal alloy, sintered diamond, or the like, and a holder 5b that holds the wheel tip 5a rotatably.

Since the upper end of the holder 5b is attached to the lower surface of the frame body 4a of the supporting frame 4, the glass cutter 5 integrally moves with the supporting frame 4, as the supporting frame 4 moves. The wheel tip 5a has a discoidshape and the central part in the thickness direction projects so as to have a largest diameter. The shaft part of the wheel tip 5a is rotatably held by the holder 5b having an opening at the bottom. The wheel tip 5a is constantly in contact with the surface of the brittle material substrate S even when the wheel tip 5a is not placed at a position to make a vertical crack on the brittle material substrate S. When the wheel tip 5a is pressed against the surface of the brittle material substrate S by an impact force larger than a predetermined level being applied, the wheel tip 5a makes a vertical crack in the brittle material substrate S.

On the upper surface of the frame body 4a of the supporting frame 4, in the vicinity of the glass cutter 5, an armature 6 that is an impact applying means is provided. A spring (not shown in the drawing) having a downward energizing force is attached around the armature 6 so that the armature 6 is constantly energized downward. Provided inside the armature 6 is a solenoid coil 6a that generates a lifting electromagnetic power when a predetermined voltage is applied thereto. When a voltage is applied, the upward electro-magnetic power of the solenoid coil 6a is balanced with the downward energizing force of the spring so that the armature 6 is in a motionless state. When a voltage applied (i.e. electric current supplied) to the solenoid coil 6a is stopped, the upward electro-magnetic power of the solenoid coil 6a is lost, and an impact force is applied to the upper surface of the frame body 4a by the downward energizing force of the spring, to an extent that the wheel tip 5a of the glass cutter 5 makes a vertical crack in the surface of the brittle material substrate S. Subsequently, when a predetermined voltage is applied again, an upward electro-magnetic power acts and the armature 6 goes back into a motionless state again.

It should be noted that, in the first embodiment, an explanation of an example of the mechanical configuration is provided in which an impact force is applied to the frame body 4a of the supporting frame 4 by the downward energizing force of the spring, when the voltage stops being applied; however, it is acceptable to have a mechanical configuration in which, on the contrary, the armature 6 is normally held in a motionless state by an upward energizing force of the spring, whereas when a voltage is applied (i.e. when electric current is supplied) a downward electro-magnetic power acts so that an impact force is applied to the frame body 4a. This latter mechanical configuration has lower electricity consumption because the electric current applying period to shorter.

On the rear end of the frame member 4a of the supporting frame 4, a cooling nozzle 7 for releasing a cooling medium is attached integrally to the frame body 4a. When the frame body 4a of the supporting frame 4 moves up and down due to unevenness in the brittle material substrate S or the like, the cooling nozzle 7 is able to move in conjunction with the up-and-down movements of the frame body 4a of the supporting frame 4. Further, the cooling nozzle 7 is connected to a cooling medium source (not shown in the drawing) in which a predetermined cooling medium is stored in a refrigerated state. Examples of the cooling medium to be released from the cooling nozzle 7 include a low-temperature liquid such as cooling water or cooling alcohol, a low-temperature gas such as nitrogen or carbon dioxide obtained by vaporization of liquid nitrogen and dry ice respectively, as well as an inert gas such as helium or argon, or simply air.

On the rear side of the servo motor 2, a laser beam oscillator 8 is provided that irradiates a predetermined laser beam onto the surface of the brittle material substrate S through a hole unit 4c provided at a predetermined position of the main frame 4a of the supporting frame 4 and that heats the portion irradiated with the laser beam. It should be noted that, in the first embodiment, a heated spot is formed on the surface of the brittle material substrate S by the laser beam oscillated by the laser beam oscillator 8; however, it is acceptable to use another heating source that generates infrared rays or ultraviolet rays besides laser beams, as long as it is possible to heat the brittle material substrate S in spots.

The laser beam oscillator 8, the glass cutter 5, and the cooling nozzle 7 mentioned above are arranged in the stated order in the direction of the movement along the guide rail 103. An irradiation area in which a laser beam is irradiated from the laser beam oscillator 8, a contact area in which the wheel tip 5a of the glass cutter 5 contacts the brittle material substrate S, and a cooling area which is cooled by the cooling medium released from the cooling nozzle 7 are positioned being adjacent to one another and in the stated order on the brittle material substrate S.

On the upper side of the serve motor 2, a control apparatus 9 is provided that controls the driving of the aforementioned constituent elements such as the driving apparatus 11, the laser beam oscillator 8, the cooling nozzle 7, and the like. The control apparatus 9 includes an encoder that detects the displacement amount in the movement of the driving apparatus 11, the laser beam oscillator 8, and the cooling nozzle 7 (i.e. the displacement amount in the movement of the frame 4) along the guide rail 103, resulting from the driving apparatus 11 and also detects the displacement amount in the up-and-down movements of the wheel tip 5a of the glass cutter 5 that is in contact with the surface of the brittle material substrate S by detecting the displacement of the rotation shaft 3 of the servo motor 2.

To be more specific, the wheel tip 5a of the glass cutter 5 provided in order to generate a vertical crack being an origination point of scribing is constantly in contact with the surface of the brittle material substrate S even when the wheel tip 5a is not placed at a position to make a vertical crack on the brittle material substrate S. When the wheel tip 5a being in contact with the surface of the brittle material substrate S moves up and down due to unevenness of the brittle material substrate S or the like, the frame body 4b of the supporting frame 4 fixing the holder 5b also moves up and down in conjunction with the up-and-down movements of the wheel tip 5a. The up-and-down movements of the frame body 4b of the supporting frame 4 generate rotating movements of the rotation shaft 3 of the servo motor 2. The encoder included in the control apparatus 9 detects the up-and-down movements of the wheel tip 5a by detecting the rotation movement of the rotation shaft 3 of the servo motor 2.

The control apparatus 9 detects, with the use of the encoder, unevenness in the surface of the brittle material substrate S from displacement amount of the wheel tip 5a. The focal point forming position of a laser beam irradiated from the laser beam oscillator 8 is adjusted based on such a detection result. The laser beam following the unevenness in the surface of the brittle material substrate S is automatically controlled to make relative movement on the substrate so that the focal point is positioned at the surface of, or in the vicinity of the surface of, or at a predetermined depth inside of, an irradiated object, depending on the beam shape, the wavelength, and the pulse width of the laser beam.

It should be noted that, in the first embodiment, the cooling nozzle 7 is integrally attached to the rear end of the frame body 4a of the supporting frame 4 so as to move in conjunction with the up-and-down movements of the glass cutter 5 being in contact with the surface of the brittle material substrate S, so that the cooling medium is released at a constant height from the surface of the brittle material substrate S; however, it is acceptable to have an arrangement wherein the height at which the cooling nozzle 7 is positioned is adjusted according to the detection results by the encoder, like in the case of the laser beam oscillator 8.

Figure 3:
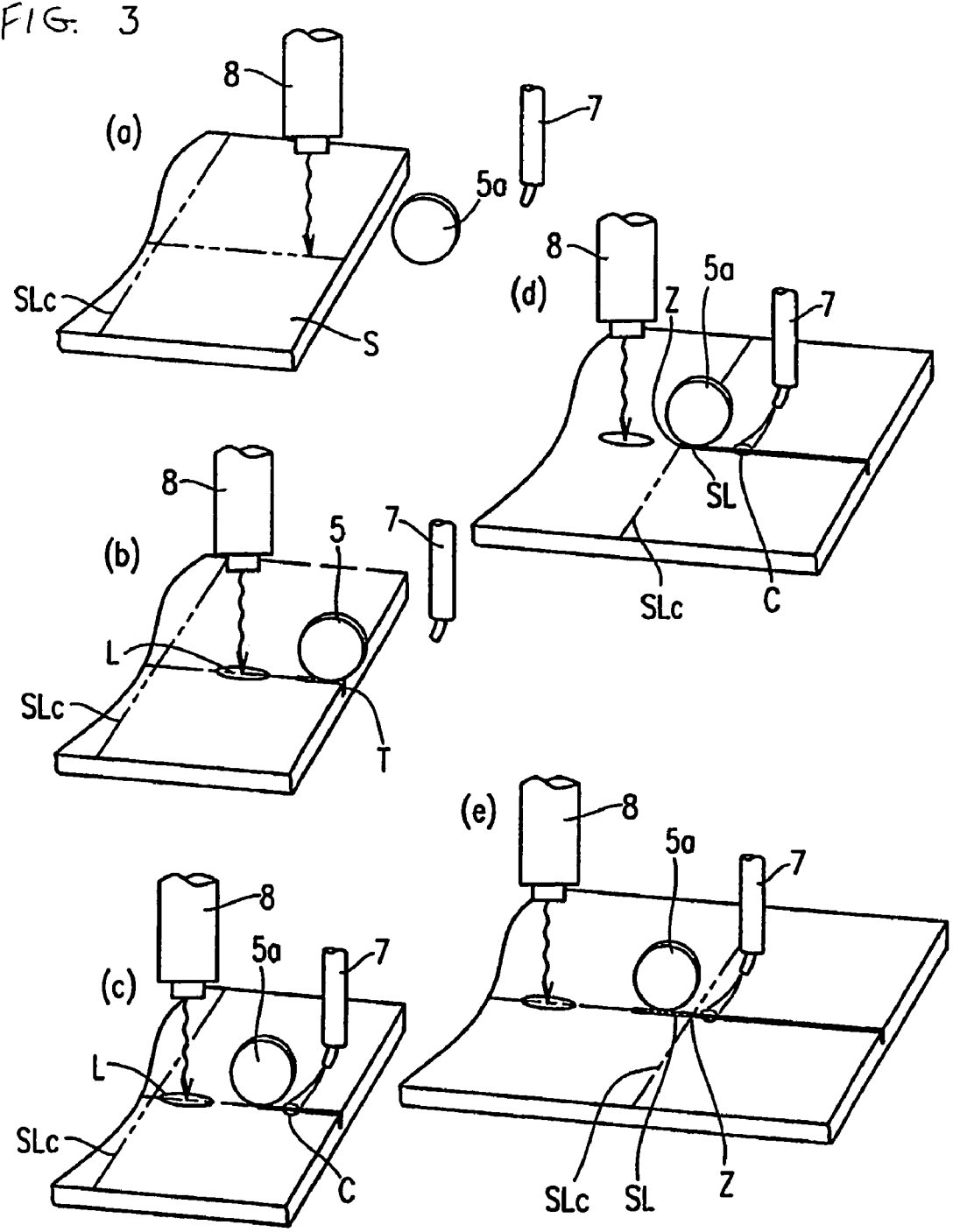
FIGS. 3(a) to 3(e) are perspective views for describing in sequential order a method of forming a scribe line using the scribe line forming apparatus according to the first embodiment.

The following describes the operation of the scribe line forming apparatus according to the first embodiment, with reference to the FIGS. 3(a) to 3(c).

As shown in FIG. 3(a), the brittle material substrate S on which a scribe line is to be formed is fixed at a predetermined position on the table 101, while the wheel tip 5a is positioned on the rear side of the table 101.

Subsequently, the driving apparatus 11 and the control apparatus 9 are driven so that the supporting frame 4 to which the wheel tip 5a, the laser beam oscillator 8, and the cooling nozzle 7 are attached is moved toward the fore (to the left side of the FIG. 1) on the surface of the brittle material substrate S. In this situation, the wheel tip 5a of the glass cutter 5 is positioned at a height slightly lower than the brittle material substrate S placed on the table 101. Further, the control apparatus 9 controls the torque exerted by the servo motor 2 on the supporting frame 4 to which the glass cutter 5 is attached, so that an excessive pressure is not applied downward to the surface of the brittle material substrate S.

When the wheel tip 5a of the glass cutter 5 driven by the driving apparatus 11 has moved forward to arrive at a position at an edge of the brittle material substrate S, control is exerted so that a pressure for generating a vertical crack in the surface of the brittle material substrate S is not applied to the glass cutter 5; therefore, after the wheel tip 5a positioned at a height slightly lower than the surface of the brittle material substrate S touches the edge of the brittle material substrate S, the wheel tip 5a continues to proceed up onto the surface of the brittle material substrate S, without chipping off the edge of the brittle material substrate S. As the wheel tip 5a has proceeded up onto the surface of the brittle material substrate S, the glass cutter 5 make up-and-down movements, and these up-and-down movements are transferred to the rotation of the rotation shaft 3 of the servo motor 2. Accordingly, the encoder included in the control apparatus 9 detects that the wheel tip 5a of the glass cutter 5 has proceeded up onto the surface of the brittle material substrate S.

When the encoder has detected that the wheel tip 5a of the glass cutter 5 has proceeded up onto the surface of the brittle material substrate S, the control apparatus 9 turns off the voltage applied to the solenoid coil 6a in the armature 6. As a result, the armature 6 moves downward due to an energizing force of the spring and applies an impact force to the upper surface of the frame body 4a. Because of this impact force being applied, the wheel tip 5a of the glass cutter 5 being in contact with the surface of the brittle material substrate S applies an abrupt impact force to the edge on the surface of the brittle material substrate S. Consequently, as shown in FIG. 3(b), a vertical crack T having a predetermined depth is folded in the surface of the brittle material substrate S. Subsequently, a voltage is applied to the solenoid coil 6a again so that an electro-magnetic power to push up the armature 6 is generated. The downward energizing force of the spring is balanced with the electro-magnetic power pushing upward, so that the armature 6 stays motionless being positioned at a predetermined height.

After the vertical crack T to be an origination point of scribing is formed at the edge of the brittle material substrate S by the wheel tip 5a of the glass cutter 5, the control apparatus 9 controls the servo motor 2 so that a pressure large enough to form a scribe line in the surface of the brittle material substrate S is not applied and so that a small load that allows the wheel tip 5a to remain in contact with the surface of the brittle material substrate S is exerted.

Since the glass cutter 5 includes the wheel tip 5a that rolls and moves while being in contact with the surface of the brittle material substrate S, when the surface of the brittle material substrate S has unevenness, is warped, or the like, the wheel tip 5a being in contact with the brittle material substrate S has up-and-down movements. In conjunction with the up-and-down movements of the wheel tip 5a, the supporting frame 4 with which the holder 5b is fixed also has up-and-down movements. Due to the up-and-down movements of the supporting frame 4, the rotation shaft 3 of the servo motor 2 has rotational movements. The encoder included in the control apparatus 9 detects unevenness, warps, and the like of the brittle material substrate S by detecting such rotational movements of the rotation shaft 3 of the servo motor 2. The control apparatus 9 adjusts the focal point position of the laser beam oscillator 8 based on unevenness, warps, and the like of the brittle material substrate S that has been detected by the encoder. As a result, even if the brittle material substrate S has unevenness or the like, a laser beam is irradiated with a focal point at a position on the surface of, or at a predetermined depth inside of, the brittle material substrate S. Since the cooling nozzle 7 for supplying a cooling medium is integrally attached to the rear end of the frame body 4b of the supporting frame 4, the cooling nozzle 7 moves up and down in conjunction with the up-and-down movements of the wheel tip 5a resulting from unevenness in the surface of the brittle material substrate S. The cooling nozzle 7 is positioned so that the distance between the end of the cooling nozzle 7 and the brittle material substrate S is kept constant. Thus, even if the brittle material substrate S has unevenness or the like, the cooling nozzle 7 is positioned so as to always be able to supply a cooling medium properly.

Subsequently, as shown in FIG. 3(c), the laser beam oscillator 8, the wheel tip 5a, and the cooling nozzle 7 each move in the predetermined directions on the surface of the brittle material substrate S, being driven by the apparatus 11 and the control apparatus 9. In this situation, on the fore side of the scanning direction, the surface of the brittle material substrate S is heated by a laser beam irradiated by the laser beam oscillator 8 to a temperature at which the surface does not melt, in other words, to a temperature lower than the glass softening point. As a result, in the irradiation area L in which the laser beam is irradiated, the surface of the brittle material substrate S is heated without being melted.

Further, on the rear side in the vicinity of the irradiation area L of the laser beam on the surface of the brittle material substrate S, a cooling medium is released from the cooling nozzle 7 so that a cooling area C is provided. In the laser beam irradiation area L heated by irradiation of a laser beam on the surface of the brittle material substrate S, a compressive stress is generated due to the heating by the laser beam. In the cooling area C onto which the cooling medium is released, a tensile stress is generated due to the cooling of the glass surface by the cooling medium. Since the tensile stress is generated being adjacent to the compressive stress generated in the laser beam irradiation area L, a stress gradient occurs between these areas due to the stress in each area. Thus, a vertical crack keeps extending in the brittle material substrate S along a planned scribe line, starting from the origination point being the vertical crack T formed at the edge of the brittle material substrate S and keeping the depth of the vertical crack T. In this manner, as a result of the laser beam oscillator 8 and the cooling nozzle 7 being scanned sequentially in predetermined directions, scribe lines extending along the scanning direction are formed.

When a scribe line is formed starting from an origination point being the vertical crack T formed by the wheel tip 5a of the glass cutter 5 at the edge of the brittle material substrate S, using a stress gradient occurring between the laser beam irradiation area L in which a laser beam is irradiated and the cooling area C onto which a cooling medium is released, there is a possibility that a scribe line may not be formed crossing over another existing intersecting scribe line SLC, in the case where, as shown in FIG. 3(d), the scribe line SLC extending in a direction to intersect the scanning direction is already formed between the laser beam irradiation area L and the cooling area C, because the stress gradient is cut off at a place where the intersecting scribe line SLC is positioned. To cope with this problem, according to the scribe line forming apparatus 1 of the present embodiment, the encoder included in the control apparatus 9 detects a distance of the movement of the supporting frame 4 being driven by the driving apparatus 11 along the guide rail 103. Since the control apparatus 9 stores in a memory the position at which the intersecting scribe line SLC has been formed, immediately before the wheel tip 5a of the glass cutter 5 arrives at a position beyond the intersecting scribe line SLC, the voltage application (electric current supply) to the solenoid coil 6a in the armature 6 is stopped. The voltage is turned off, not at the same time as the wheel tip 5a arrives at the intersecting scribe line SLC, but earlier than the arrival time, for the sum of a period of electric transient delay due to an inductance component of the solenoid coil 6a and a period of delay due to mechanical inertia for the movement of the wheel tip 5a to rise to a predetermined height directly above the intersection position Z. It is possible to calculate the sum of the periods from electric property values of the coil, the electric current value to be applied (a required torque value), and the movement speed of the wheel tip 5a relative to the substrate. Delay period values are calculated in this manner and are pre-stored in the control apparatus 9 so that an appropriate delay period value can be read from the storage area and used, every time a new scribe condition is set or the scribe condition is altered. When the electricity supplied to the solenoid coil 6a is stopped earlier by a period corresponding to a delay period, the armature 6 moves downward due to the energizing force of the spring and applies an Impact force to the upper surface of the supporting frame 4. Because of this impact force being applied, an abrupt impact force is applied to the edge of the surface of the brittle material substrate S and to the vicinity of the intersection position Z shown in FIG. 3(e); thereby a vertical crack T having a predetermined depth to be an origination point for the scribe line formation is formed at a position beyond the intersecting scribe line SLC provided on the surface of the brittle material substrate S.

With this arrangement, even if a scribe line SLC is formed so as to extend in a direction to intersect the scanning direction and to be in the path of another scribe line SL to be formed, it is possible to form the scribe line SL continued from a vertical crack T without failure.

As explained so far, the scribe line forming apparatus 1 of the first embodiment generates a vertical crack T in the surface of the brittle material substrate S with an impact force from the armature 6 provided above the glass cutter 5. Since an abrupt impact force is applied only to a desired position on the surface of the brittle material substrate S, it is possible to generate the vertical crack T having a sufficient depth to divide the substrate into sections with high accuracy.

The impact force from the armature 6 may be limited to an extremely little strength compared to a pressure provided by a conventional a lifting and lowering apparatus. Thus, it is possible to make the scribe line forming apparatus simple and compact in size.

When an impact force is not applied from the armature 6, the glass cutter 5 performs a scribing operation while being in contact with the surface of the brittle material substrate S with a required minimum scribe pressures therefore, it is possible to prevent chipping and the like that may be caused at the edge of the brittle material substrate S when the wheel tip 5a of the glass cutter 5 proceeds up onto the brittle material substrate S.

Further, the wheel tip 5a of the glass cutter 5 being in contact with the surface of the brittle material substrate S moves up and down in accordance with unevenness or the like of the surface of the brittle material substrate S, and the encoder detects the up-and-down movements of the wheel tip 5a from rotation of the rotation shaft 3 of the servo motor 2. Since the focal point position of the laser beam oscillator 8 is adjusted according to the detection results of the encoder, even if the brittle material substrate S has unevenness or the like, a laser beam is properly irradiated at a position on the surface of, or at a predetermined depth inside of, the brittle material substrate S, so that a scribe line can be formed in the surface of, or inside of, the substrate with high accuracy.

Furthermore, a vertical crack T being an origination point of a scribe line is formed by the wheel tip 5a of the glass cutter 5, and the vertical crack T is urged to extend along a planned scribe line, by means of thermal strain of the brittle material substrate S, based on a temperature gradient that occurs between the heating with a laser beam and the cooling with a cooling medium on the brittle material substrate S. Thus, cullet is generated only by a very small amount near the origination point, and the amount of cullet generated is very much smaller than in the case where a conventional method with a blade is used.

The control apparatus 9 controls the driving of the driving apparatus 11 so that the wheal tip 5a moves while being kept in contact with the surface of the brittle substrate by a load which does not allow the wheel tip 5a to damage the surface. When the wheel tip 5a is positioned in the vicinity of an edge of the brittle material substrate S or in the vicinity of the intersection position Z of a scribe line SLC that has previously been formed, the control apparatus 9 controls the driving of the armature 6 so that a vertical crack having a predetermined depth is generated in the brittle substrate; therefore, it is possible to form a scribe line SL with high accuracy.

The Second Embodiment

Figure 4:
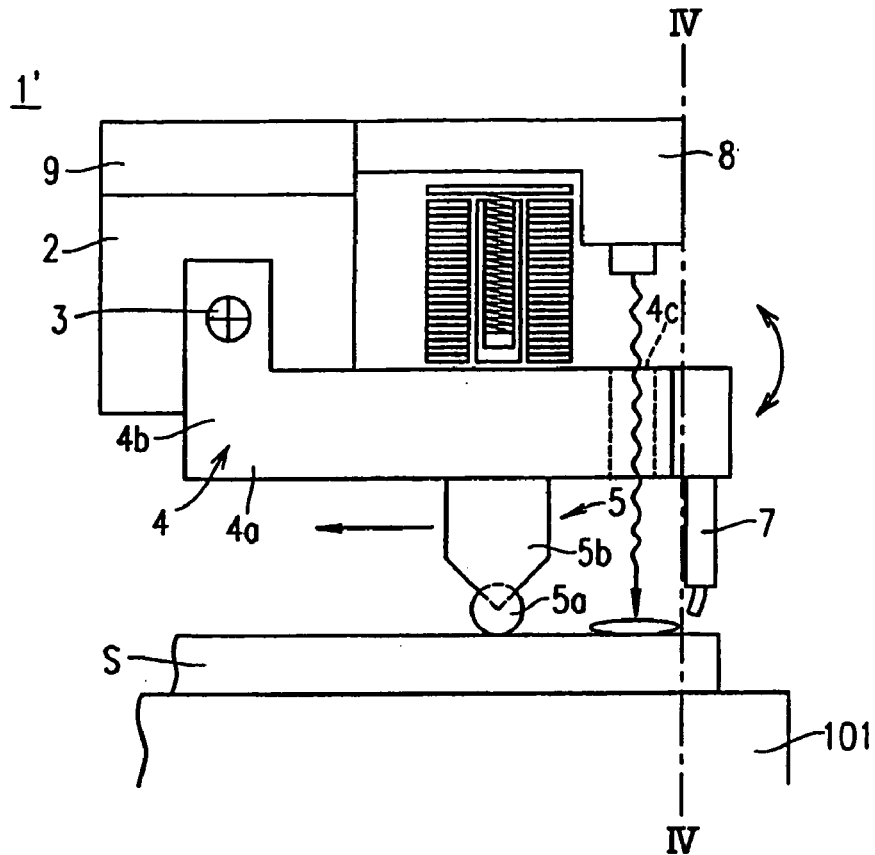
FIG. 4 is a side view that schematically shows a scribe line forming apparatus according to the second embodiment.
Figure 5:
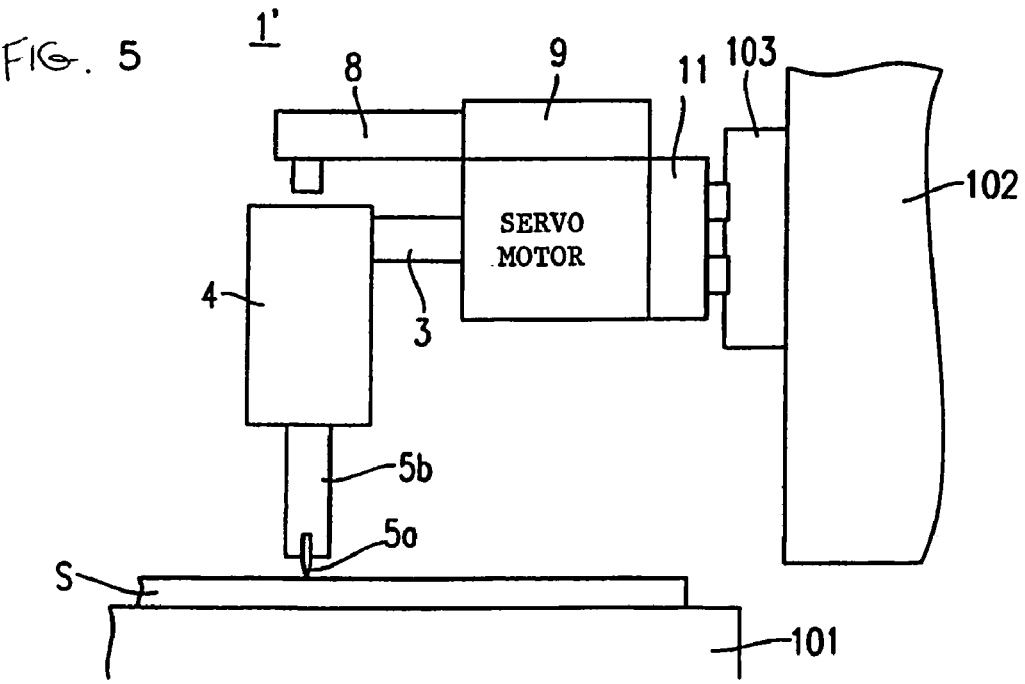
FIG. 5 is a front view that schematically shows the scribe line forming apparatus according to the second embodiment.
Figure 6:
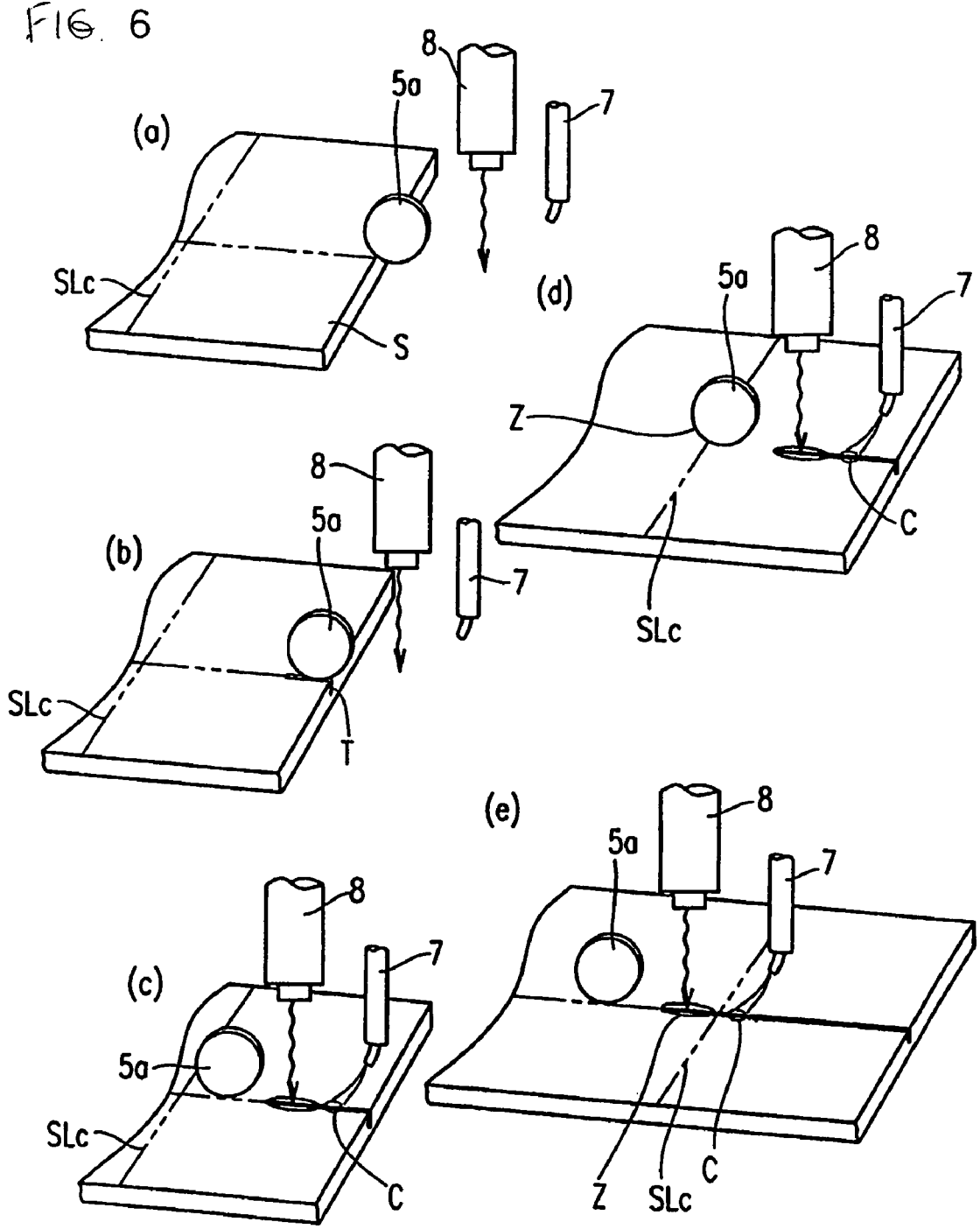
FIGS. 6(a) to 6(e) are perspective views for describing in sequential order a method of forming a scribe line using the scribe line forming apparatus according to the second embodiment.

FIG. 4 is a side view that schematically shows a scribe line forming apparatus 1' according to the second embodiment. FIG. 5 is a front view of the scribe line forming apparatus 1' viewed from a cross sectional line IV-IV in FIG. 4.

In the scribe line forming apparatus 1' according to the second embodiment, as shown in FIG. 4, the laser beam oscillator 8 is provided so as to prolong toward the rear side (the right side in the drawing) from the control apparatus 9 so that a laser beam is irradiated on the rear side of the position at which the wheel tip 5a of the glass cutter 5 is in contact with the surface of the brittle material substrate S.

Since other configurations are the same as those of the scribe line forming apparatus 1 according to the first embodiment, detailed explanation will be omitted.

In the scribe line forming apparatus 1', the wheel tip 5a, the laser beam oscillator 8, and the cooling nozzle 7 are arranged in the stated order along the direction of the movement following the guide rail 103. Accordingly, a contact area in which the wheel tip 5a of the glass cutter 5 contacts the brittle material substrate S, an irradiation area in which a laser beam is irradiated from the laser beam oscillator 8, and a cooling area which is cooled by the cooling medium released from the cooling nozzle 7 are positioned being adjacent to one another on the brittle material substrate S.

In the scribe line forming apparatus 1' of the second embodiment, the encoder included in the control apparatus 9 detects the up-and-down movements of the wheel tip 5a of the glass cutter 5 that moves while being in contact with the surface of the brittle material substrate S, based on rotation of the rotation shaft 3 of the servo motor 2. The laser irradiation position of the laser beam oscillator 8 provided on the rear side of the glass cutter 5 is adjusted according to the detection results.

The operation of the scribe line forming apparatus 1' according to the second embodiment is substantially the same as the operation of the scribe line forming apparatus 1 according to the first embodiment described above. Since FIGS. 6(a) to 6(e) are provided for reference to illustrate the operation of the scribe line forming apparatus 1' of the second embodiment, detailed explanation will be omitted.

The scribe line forming apparatus 1' of the second embodiment generates a vertical crack T in the surface of the brittle material substrate S with an impact force from the armature 6 provided above the glass cutter 5. Since an abrupt impact force is applied only to a desired position on the surface of the brittle material substrate S, it is possible to generate the vertical crack T having a sufficient depth to divide the substrate into sections with high accuracy. When an impact force is not applied from the armature 6, the wheel tip 5a of the glass cutter 5 receives only a light load that allows the wheel tip 5a to remain in contact with the surface of the brittle material substrate S and to generate a predetermined scribe line; therefore, it is possible to prevent chipping and the like that may be caused at the edge of the brittle material substrate S when the wheel tip 5a of the glass cutter 5 proceeds up onto the brittle material substrate S.

Further, the wheel tip 5a of the glass cutter 5 being in contact with the surface of the brittle material substrate S moves up and down in accordance with unevenness or the like of the surface of the brittle material substrate S, and the encoder detects the up-and-down movements of the wheel tip 5a from rotation of the rotation shaft 3 of the servo motor 2. The focal point position of the laser beam oscillator 8 is adjusted so as to be in accordance with the unevenness of the brittle material substrate S, based on the detection results of the encoder; therefore, even if the brittle material substrate S has unevenness or the like, a laser beam is properly irradiated at a position on the surface of, or at a predetermined depth inside of, the brittle material substrate S, so that a scribe line can be formed with high accuracy.

The Third Embodiment

Figure 7:
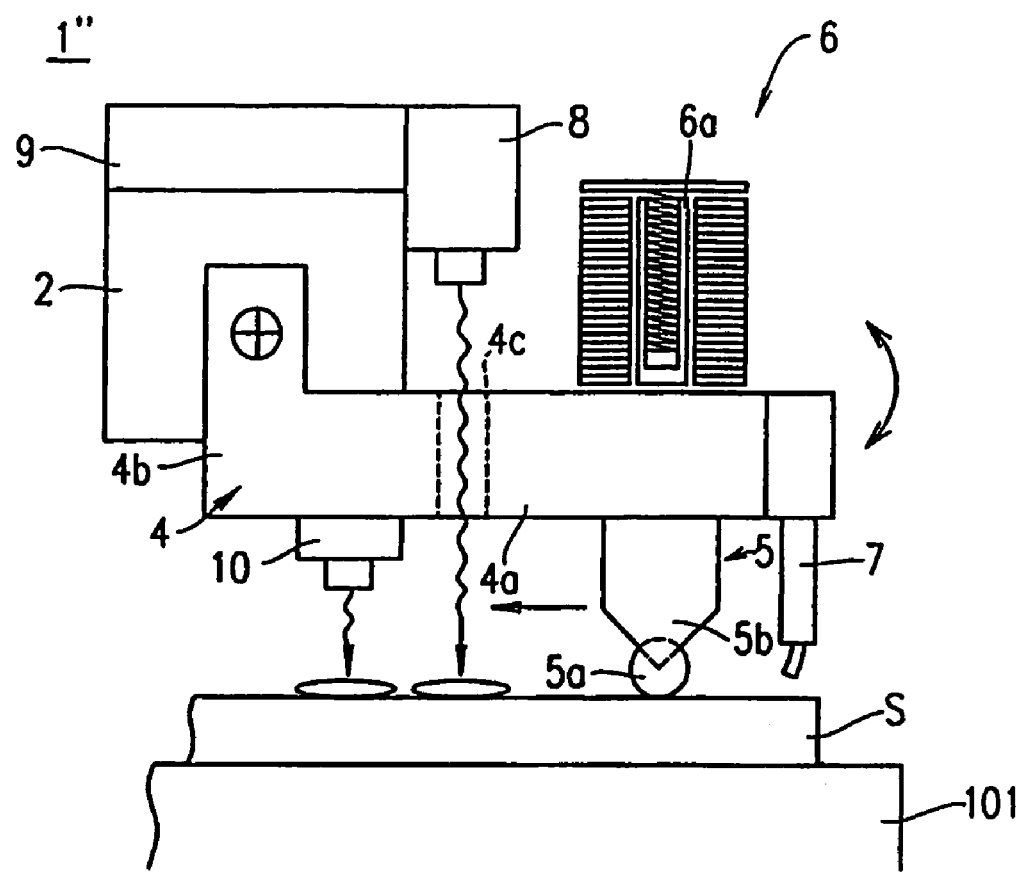
FIG. 7 is a front view that schematically shows a scribe line forming apparatus according to the third embodiment.

FIG. 7 is a side view that schematically shows a scribe line forming apparatus 1" according to the third embodiment.

In the third embodiment, on the lower surface of the frame body 4a of the supporting frame 4, at a position to the fore of the glass cutter 5, a laser displacement gauge 10 is provided that detects, by irradiation of a laser beam, changes in the brittle material substrate S, such as unevenness, warps, and the like. Since other configurations are the same as those of the scribe line forming apparatus 1 according to the first embodiment, detailed explanation will be omitted.

Also, the operation of the scribe line forming apparatus 1" of the third embodiment is substantially the same as the operation of the scribe line forming apparatus 1 according to the first embodiment described above, except that unevenness in the surface of the brittle material substrate S is detected with the use of the laser displacement gauge 10; therefore, detailed explanation will be omitted.

The scribe line forming apparatus 1" of the third embodiment generates a vertical crack T in the surface of the brittle material substrate S with an impact force from the armature 6 provided above the glass cutter 5. Since an abrupt impact force is applied only to a desired position on the surface of the brittle material substrate S, it is possible to generate the vertical crack T having a sufficient depth to divide the substrate into sections with high accuracy. When an impact force is not applied from the armature 6, the wheel tip 5a of the glass cutter 5 receives only a light load that allows the wheel tip 5a to remain in contact with the surface of the brittle material substrate S and to generate a predetermined scribe line; therefore, it is possible to prevent chipping and the like that may be caused at the edge of the brittle material substrate S when the wheel tip 5a of the glass cutter 5 proceeds up onto the brittle material substrate S.

Further, the laser displacement gauge 10 provided at the fore of the glass cutter 5 being in contact with the surface of the brittle material substrate S detects unevenness or the like of the surface of the brittle material substrate S. The focal point position of the laser beam oscillator 8 is adjusted so as to be in accordance with the unevenness of the brittle material substrate S, based on the detection results of the laser displacement gauge 10; therefore, even if the brittle material substrate S has unevenness or the like, a laser beam is properly irradiated at a position on the surface of, or at a predetermined depth inside of, the brittle material substrate S, so that a scribe line can be formed with high accuracy.

It is to be noted that unevenness and the like of the surface of the brittle material substrate S may be detected with the use of a contact displacement gauge instead of the laser displacement gauge 10 mentioned above.

In each of the scribe line forming apparatuses described in the first through third embodiments, the glass cutter 5, the cooling nozzle 7, and the laser beam oscillator 8 are fixed at predetermined positions, however, it is acceptable to have a configuration wherein these components are arranged, using a publicly known technique, on the supporting frame 4 so that their positions relative to one another can be changed according to scribe line forming conditions. With this configuration, it is possible to properly form a scribe line that meets the scribe line forming conditions. It is suggested that the publication of the Japanese Patent No. 3027768 may be referenced for various conditions in scribe line formation and the relationship between these conditions and the relative positions of the components to one another.

According to each of the scribe line forming apparatuses of the first through third embodiments, the wheel tip 5a of the glass cutter 5 generates a vertical crack T to be an origination point of a scribe line on the brittle material substrate S, and unevenness and warps in the surface of the brittle material substrate S are detected; therefore, it is possible to make the apparatus configuration inexpensive and compact in size.

One of the characteristics of the present invention is to be able to generate a vertical crack T to be an origination point of a scribe line after an edge of the substrate S or the intersection position Z is heated by a laser beam in advance; therefore, it is possible to prevent an uncontrollable crack from being generated at an edge of the substrate S or at the intersection position Z.

By driving the control apparatus 9 so that a vertical crack T is formed at a position slightly inside from an edge of the substrate in terms of the movement direction (an inner out start) or so that the formation of a scribe line is terminated slightly before it reaches an edge at the end of the movement direction (an inner cut finish), it is possible to prevent such an uncontrollable crack from being generated.

INDUSTRIAL APPLICABILITY

As explained so far, according to the present invention, a wheel tip of a glass cutter is moved while being kept in contact with a brittle substrate by a load which does not allow the wheel tip to damage the surface of the substrate. A vertical crack is generated at a desired position in the brittle substrate with an impact force applying means that applies an abrupt impact force to the glass cutter moving on the brittle substrate for generating the vertical crack having a predetermined depth. With respect to the generated vertical crack, a laser beam oscillator and a cooling nozzle are provided so as to be arranged along a planned scribe line, the laser beam oscillator being for irradiating a laser beam to form an irradiation area having a temperature lower than the softening point of the brittle substrate, and the cooling nozzle being for releasing a cooling medium to cool down the brittle substrate. Due to a stress gradient that occurs between a compressive stress generated in the irradiation area on the brittle substrate at which the laser beam is irradiated from the laser beam oscillator and a tensile stress generated in a cooling area onto which the cooling medium is released from the cooling nozzle, the vertical crack generated by the glass cutter is urged to extend along the planned scribe line so as to form a scribe line.

According to the present invention with this arrangement, since the wheel tip receives a load that only allows the wheel tip to remain in contact with the brittle substrate when being positioned somewhere other than a desired position at which the vertical crack is to be generated in the surface of the brittle substrate, no excessive pressure is applied to the brittle substrate; therefore, it is possible to prevent the wheel tip of the glass cutter from damaging the brittle substrate, for example, chipping off the substrate, when the wheel tip proceeds up onto the brittle substrate, for instance.

Further, even if the surface of the brittle substrate has unevenness or the brittle substrate is warped, it is possible to adopt an appropriate scribe condition that is in accordance with the height of the surface of the brittle substrate; therefore, it is possible to always form a stable scribe line.

Furthermore, a blade is used for the formation of a vertical crack to be an origination point of a scribe line; however, other than that, the vertical crack is made to extend along a planned scribe line so as to form a scribe line with the use of thermal strain generated in the brittle substrate; therefore, cullet is generated only by a very small amount near the origination point, and the amount of cullet generated is very much smaller than in the case where a conventional method with a blade is used.

The invention claimed is:

1. A scribe line forming apparatus comprising:
    a vertical crack forming member that has a blade at a tip thereof and is used for forming a vertical crack to be an origination point of a scribe line by pressing the blade against a surface of a brittle substrate with pressure;
    an impact force applying means for applying an abrupt impact force to the vertical crack forming member in order to generate the vertical crack having a predetermined depth at a desired position in the brittle substrate;
    a heating means for forming an area having a temperature lower than a softening point of the brittle substrate;
    a cooling means for cooling the brittle substrate;
    an arrangement movement means for arranging the heating means, the vertical crack forming member, the impact force applying means, and the cooling means to be positioned so as to move relative to the brittle substrate at predetermined intervals along a planned scribe line that is prearranged on the surface of the brittle substrate; and
    a control unit that controls driving of the impact force applying means.

2. The scribe line forming apparatus according to claim 1, wherein
    the control unit controls driving of the vertical crack forming member and the arrangement movement means so that the blade moves while being kept in contact with the surface of the brittle substrate by a load which does not allow the blade to damage the surface of the brittle substrate, and when the blade is positioned in the vicinity of an edge of the brittle substrate and in the vicinity of a passing point at which the blade passes a previously-formed scribe line, the control unit controls the driving of the impact force applying means so as to generate the vertical crack having the predetermined depth in the brittle substrate.

3. The scribe line forming apparatus according to claim 1, wherein
    the heating means includes a servo mechanism that detects a change in a height of the surface of the brittle substrate from up-and-down movements of the vertical crack forming member moving on the brittle substrate and adjusts a focal point of a laser beam irradiated from a laser beam oscillator according to a result of the detection.

4. The scribe line forming apparatus according to claim 1, wherein
    the cooling means is arranged by the arrangement movement means so as to move up and down in conjunction with up-and-down movements of the vertical crack forming member that moves on the brittle substrate.

5. The scribe line forming apparatus according to claim 1, wherein
    the arrangement movement means either arranges the vertical crack forming member, and the heating means, and the cooling means to be positioned in the stated order from a fore side of the planned scribe line, or arrange the heating means, the vertical crack forming member, and the cooling means to be positioned in the stated order from the fore side of the planned scribe line.

6. The scribe line forming apparatus according to claim 1, wherein
    the arrangement movement means arranges the vertical crack forming member, the heating means, and the cooling means so as to be able to change positions relative to one another.

7. The scribe line forming apparatus according to claim 1, wherein
    the cooling means includes a servo mechanism that adjusts a height at which the cooling means is positioned.

8. The scribe line forming apparatus according to claim 1, wherein
    the vertical crack forming member is a glass cutter that includes a wheel tip serving as the blade and rollably supports the wheel tip.

9. The scribe line forming apparatus according to claim 1, wherein
    the heating means is a laser beam oscillator that irradiates a predetermined laser beam.

10. A scribe line forming apparatus according to claim 1, wherein
    the cooling means is a cooling nozzle from which a cooling medium is released.

11. The scribe line forming apparatus of claim 1, wherein the impact force applying means is an armature that generates movement inertia for pressing the blade against the surface of the brittle substrate by turning on or off electricity supplied to a solenoid coil.

12. The scribe line forming apparatus according to claim 1, further comprising;
one of a laser displacement gauge and a contact displacement gauge for detecting a change in a height of the surface of the brittle substrate.

13. The scribe line forming apparatus according to claim 1, wherein
the brittle substrate is one of a glass substrate for a liquid crystal display device, a glass substrate for a plasma display panel, and a glass substrate for an organic EL display panel.

14. The scribe line forming apparatus according to claim 1, wherein
the impact force applying means comprises a spring adjacent to the blade of the vertical crack forming member that applies a downward force, and a solenoid coil that generates a lifting electromagnetic force to counteract the spring force, wherein
when a voltage applied to the solenoid coil is removed, the electromagnetic force of the solenoid ceases and the spring force causes an abrupt impact that drives the blade against the substrate to generate the vertical crack.

15. A scribe line forming method comprising the steps of:
while making a vertical crack forming member having a blade at a tip thereof move on a brittle substrate, generating a vertical crack having a predetermined depth at a desired position on a brittle substrate with an impact force applying means that applies an abrupt impact force to the blade;
forming a scribe line by forming, with the vertical crack, an irradiation area that has a temperature lower than a softening point of the brittle substrate along a planned scribe line arranged on the brittle substrate, and forming a cooling area in rear of the irradiation area.

16. The scribe line forming method according to claim 15, wherein
the generating step of generating the vertical crack having the predetermined depth at the desired position on the brittle substrate by the impact force applying means is performed when the blade is positioned in the vicinity of an edge of the brittle substrate and in the vicinity of an intersection position at which the blade intersects a previously-formed scribe line.

17. The scribe line forming method according to claim 15, wherein the vertical crack is formed at a position slightly inside from an edge of the substrate.

18. The scribe line forming method according to claim 15, wherein the generating step of generating the vertical crack having the predetermined depth at the desired position on the brittle substrate by the impact force applying means comprises:
applying a downward spring force to a spring adjacent the blade of the vertical crack forming member and applying a lifting electromagnetic force to a solenoid coil to counteract the spring force, and
removing a voltage applied to the solenoid coil to cease the counteracting electromagnetic force of the solenoid such that the spring force causes an abrupt impact that drives the blade against the substrate to generate the vertical crack.

\* \* \* \* \*